Figure 1:
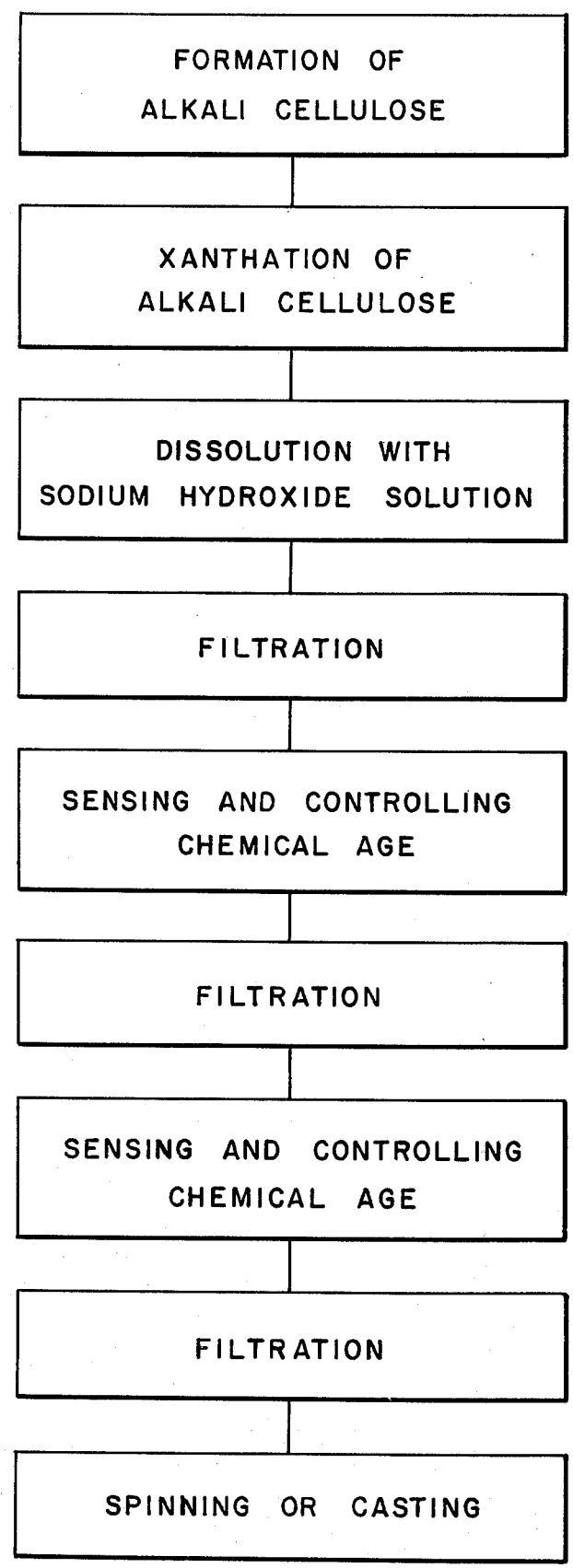

United States Patent [19]

Geyer, Jr. et al.

[11] 4,284,765

[45] Aug. 18, 1981

[54] AUTOMATIC AGING ANALYZER USING A MOTOR HAVING A CONSTANT TORQUE

[75] Inventors: Charles J. Geyer, Jr., Berwyn; Ben E. White, Wayne, both of Pa.

[73] Assignee: Fiber Associates, Inc., Berwyn, Pa.

[21] Appl. No.: 102,397

[22] Filed: Dec. 11, 1979

[51] Int. Cl.³ .................... C08B 9/04; C08B 17/00
[52] U.S. Cl. .................... 536/60; 422/226; 536/61
[58] Field of Search .............. 536/60, 61; 422/226

[56] References Cited

U.S. PATENT DOCUMENTS

| | | | |
|---|---|---|---|
| 2,019,944 | 11/1935 | Walch | 536/61 |
| 2,495,235 | 1/1950 | Pierrat et al. | 536/61 |
| 4,037,039 | 7/1977 | Geyer et al. | 536/60 |

FOREIGN PATENT DOCUMENTS 571319  2/1959  Canada ..................... 536/61

Primary Examiner—Ronald W. Griffin
Attorney, Agent, or Firm—Miller & Prestia

[57] ABSTRACT

This invention relates to a process and apparatus for the manufacture of viscose products which includes a motor means having a constant torque in the viscose during ripening wherein the resistance on said motor means changes as the viscose ripens because of the change in viscosity and the temperature is adjusted in response to said change in viscosity to heat or cool the viscose, and thereby control its rate of aging.

4 Claims, 3 Drawing Figures

AUTOMATIC AGING ANALYZER USING A MOTOR HAVING A CONSTANT TORQUE

BACKGROUND OF THE INVENTION

The present invention relates to an improvement in the process for the manufacture of viscose from a cellulose raw material. It is well known that the preparation of the spinning or casting solution of viscose in the manufacture of rayon or cellophane is conventionally effected by steeping the cellulose in caustic soda, expressing the excess caustic, shredding and aging the resulting alkali cellulose to a desired molecular size, reacting the aged alkali cellulose with carbon disulfide to form cellulose xanthate, and dissolving the latter in dilute caustic soda to form a viscose solution. This solution is aged or ripened and filtered prior to spinning or casting into a film.

The properties of the final product depend upon a number of different factors. One important factor is the ripening of the viscose.

The process of viscose aging involves a spontaneous breaking down of some of the xanthate sulfur linkages, resulting in a lower xanthate sulfur content, a lower solubility of the cellulosic material and easier coagulability.

If the degree of ripening is not kept constant, then the properties of the resultant fiber or fibers will vary widely. In fact, if the chemical age is far from specification, the coagulation properties of the viscose may be incompatible with the particular spinning conditions being used, and the viscose may not spin at all.

In conventional practice the determination of the proper chemical age or degree of ripeness is done by periodically testing samples by either a salt test for determining its coagulability or by a chemical analysis of xanthate and the total sulfur content of the viscose.

BRIEF DESCRIPTION OF THE INVENTION

During the aging of viscose, it is known that the viscosity of the viscose solution decreases quite rapidly, reaching a minimum, and then gradually rising to infinity, or solidifies.

The knowledge of the viscosity of a given viscose can be correlated with its chemical age and can be used as a control criteria.

It is the object of this invention to use a continuous measuring viscosimeter installed in a line through which the viscose is flowing to measure the viscosity, and thereby the chemical age, and to use the signals from the recording instrument to adjust the aging conditions to control the rate of aging.

It is known that temperature and chronological age are the major variables in viscose aging. Since production of viscose rayon is a continuous process, and the preparation of viscose from the steeping of the pulp to the time of spinning can take from 12 hours up to 100 hours in some processes, it is apparent that one must schedule production with care. It is known that changing chronological age is not an easy variable to use without varying the production rate of the operation. Consequently, in this invention, temperature is utilized as the control variable.

More specifically, it is an object of this invention to provide a means for automatically analyzing the degree of ripening of the viscose by means of a continuous recording viscosimeter, and to provide means for automatically controlling the temperature as required.

In the conventional viscose ripening process, successive batches of viscose are pumped through a series of tanks, with several steps of filtration interspersed in this passage through the aging process, followed by a deaeration step and perhaps, a final filtration step enroute to the spinning machine. Normally, the temperature of the viscose is carefully controlled as it leaves the mixing stage, and the remainder of the aging is carried out in a constant temperature room, called a cellar. For control purposes, either the temperature leaving the mixer or the room temperature can be varied, with the former being the common choice.

The viscosity analyser of the present invention can be located conveniently at either the inlet portion to deaeration zone or the outlet portion from a final filtration zone in the pipe leading to the spinning machine.

In a continuous aging and filtration operation (such as disclosed in copending application Ser. No. 89,129) it would be feasable to have several zones of temperature control.

Other objects and advantages of this invention will become more apparent hereinafter, and in the drawings.

DRAWINGS

Figure 2:
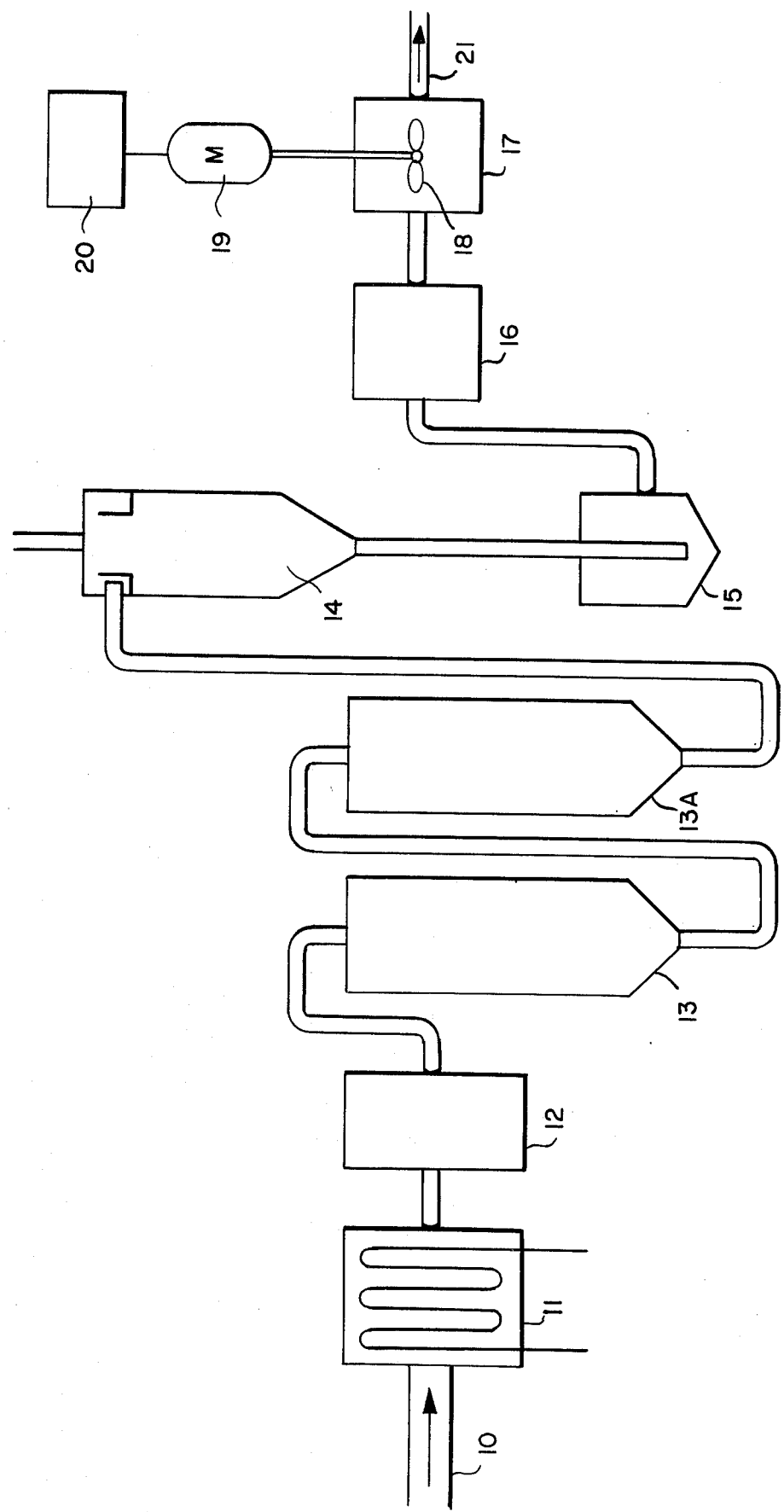
Figure 3:
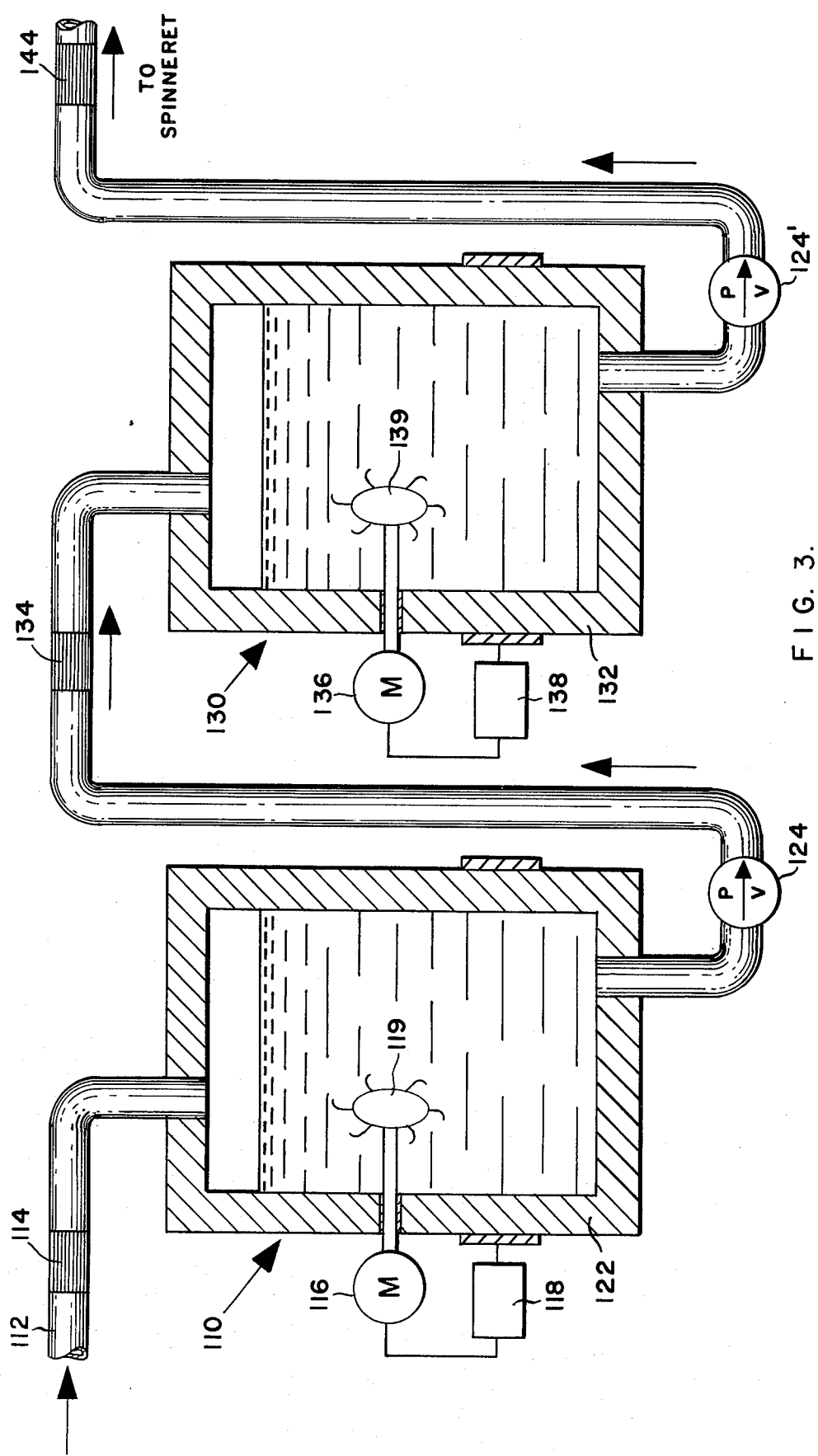

FIG. 1 is a schematic view showing the ripening stage of viscose in a continuous process; in accordance with this invention, and FIG. 2 is a diagrammatic illustration of one embodiment of the process and apparatus of the present invention, and FIG. 3 is a diagrammatic illustration of a further embodiment of the present invention.

With reference to FIG. 1, there will be seen that in a continuous process, aged alkali cellulose prior to entry into the ripening zone is xanthated with an amount of carbon disulfide and the xanthate is continuously dissolved in a solution of NaOH. The solution may then be flowed continuously to the ripening zone. Optionally, prior to entry into the ripening zone, the viscose solution may be passed through a filtration zone. Once in the initial ripening zone, the chemical age or viscosity of the viscose may be determined. In accordance with the present invention, the chemical age of the viscose is determined by measuring the viscosity of the viscose and the changes in the chemical age of the viscose is noted by the change in the viscosity as noted by the change in the running speed of a constant torque motor. Prior to the temperature control, the viscose may be passed through a second filtration zone into another ripening zone wherein the chemical aging of the viscose is sensed. Sensing of the chemical age may begin to be performed in the second ripening zone by observing the viscosity of the viscose solution. When the viscose is brought into the second ripening zone, the first ripening zone may be filled with fresh viscose so that the process may be substantially continuous. If desired, the viscose, when reaching its desired ripening or viscosity in a second ripening zone, may be further filtered and passed into additional ripening zones prior to final filtration and passage to the spinning or casting zone. Thus, the viscose may be ripened in a single ripening zone or partially ripened in a series of ripening zones as required in order to have continuous filtration and passage of viscose to becoming the final viscose product.

FIG. 2 is a diagrammatic illustration of the preferred process and apparatus of the present invention, using a single sensing and controlling device located in the viscose line leading to a spinning machine. For the purpose of this illustration there is shown a heat exchanger used to control the temperature of the incoming viscose. In practice, this temperature controlling element may be part of the final stage of mixing.

As seen in FIG. 2, the viscose comes either directly from the viscose mixers or from a mixer storage tank (not shown) through line 10, to a heat exchanger unit 11. It then passes through a filter zone 12 and aging tanks 13,13A and then to a deaeration means 14 and deaerator receiving tank 15. From tank 15 the viscose proceeds into a further filtration zone 16 and through a vessel 17, which is equipped with an impeller 18, that is driven by a constant torque motor 19. A recorder-controller means 20 monitors the speed of the motor, which is a function of the viscosity of the viscose, and controls the temperature of the viscose passing through the heat exchanger 11. For example, if the speed is slower than desired, the viscosity is high which indicates the viscose is riper than desired. A signal from the recorder is transmitted to the heat exchanger so that it will cause aging to slow. Since the viscosity of a liquid is also temperature dependent, the temperature of the viscose is measured and a viscosity correction is made in the controller 20.

In accordance with a further embodiment of the invention illustrated in FIG. 3, xanthated cellulose in a NaOH solution enters into the first viscose ripening vessel 110 from inlet 112 after passage through one or more filters 114. Vessel 110 is provided with a constant torque motor 116 having a resistance means, such as a propeller 119 which continuously runs. The speed of the motor 116 which is effected by the resistance of the viscose on the propeller 119, is scanned by monitor 118 which activates temperature control means 122 to heat or cool the solution. When the monitor 118 detects the speed of the motor 116 which has changed because of the change in viscosity of the viscose due to the chemical aging, the temperature control means 122 is activated to either heat or cool the vessel 110 and the viscose.

After ripening in the first ripening vessel, as required, the viscose may be evacuated through a pump valve 124 to a further ripening vessel 130. If desired, the viscose passes through one or more filters 134 before entering the further ripening vessel 130. Ripening vessel 130 is also provided with a constant torque motor 136 with a propeller means 139 and a monitor 138 which senses the speed of the motor 136 that is influenced by the resistance on the propeller means. The monitor 138 can activate the temperature control means 132 which may either heat or cool the vessel 130 as required so that the ripening process in vessel 130 can proceed as required.

After ripening of the viscose in vessel 130, the viscose is evacuated by means of pump valve 124' through another filter to other viscose ripening vessels or to a spinning or casting means.

Similarly as in vessel 110, the monitor 138 continuously scans the speed of the motor 136 which is affected by the viscosity of the viscose. The monitor 138 is set to observe the under-ripe and the over-ripe stages of the viscose.

While this invention has been described with respect to selected embodiments and examples, it should be understood that various modifications and adaptations of the process and apparatus of the present invention may be made without departing from the spirit and scope as defined in the appended claims. Accordingly, the appended claims are intended to be construed to cover all such variations and adaptations of the invention which may be made by those skilled in the art without departing from the true spirit and scope thereof.

We claim:

1. In a process for the manufacture of viscose products which includes the step of ripening a homogeneous viscose solution prior to spinning or casting, the improvement which comprises in the ripening stage the steps of operating a motor means having a constant torque in said viscose during ripening, said motor means having its speed influenced by the viscosity of said viscose solution, monitoring the change in speed of said motor resulting from the change in viscosity of said viscose solution during ripening, and then controlling the temperature of said viscose in response to said monitoring, so as to bring the viscose solution to the desired degree of ripeness whereby the resistance on said motor means changes as the viscose ripens because of the change in viscosity and the temperature is adjusted in response to said change in viscosity to heat or cool the viscose and thereby altering the rate of ripening.

2. The process according to claim 1 wherein said motor means is continuously operated.

3. The process according to claim 1 wherein said motor means is provided with a propeller which turns in said viscose.

4. In an apparatus for controlling the ripening of a viscose solution in the manufacture of viscose products prior to spinning or casting, the improvement which comprises including motor means having a constant torque operating in a viscose solution, said motor means having its speed influenced by the viscosity of said viscose solution, means for monitoring the change in speed of said motor means through said viscose solution during ripening and means for controlling the temperature of said viscose solution in responses to a signal from said monitor means, so as to bring the viscose solution to the desired degree of ripeness whereby when the resistance on said motor means changes as the viscose solution ripens because of the change in viscosity, and the temperature is adjusted in response to the monitoring of the change in viscosity to either heat or cool the viscose solution and thereby altering the rate of ripening.

* * * * *